Figure 1:
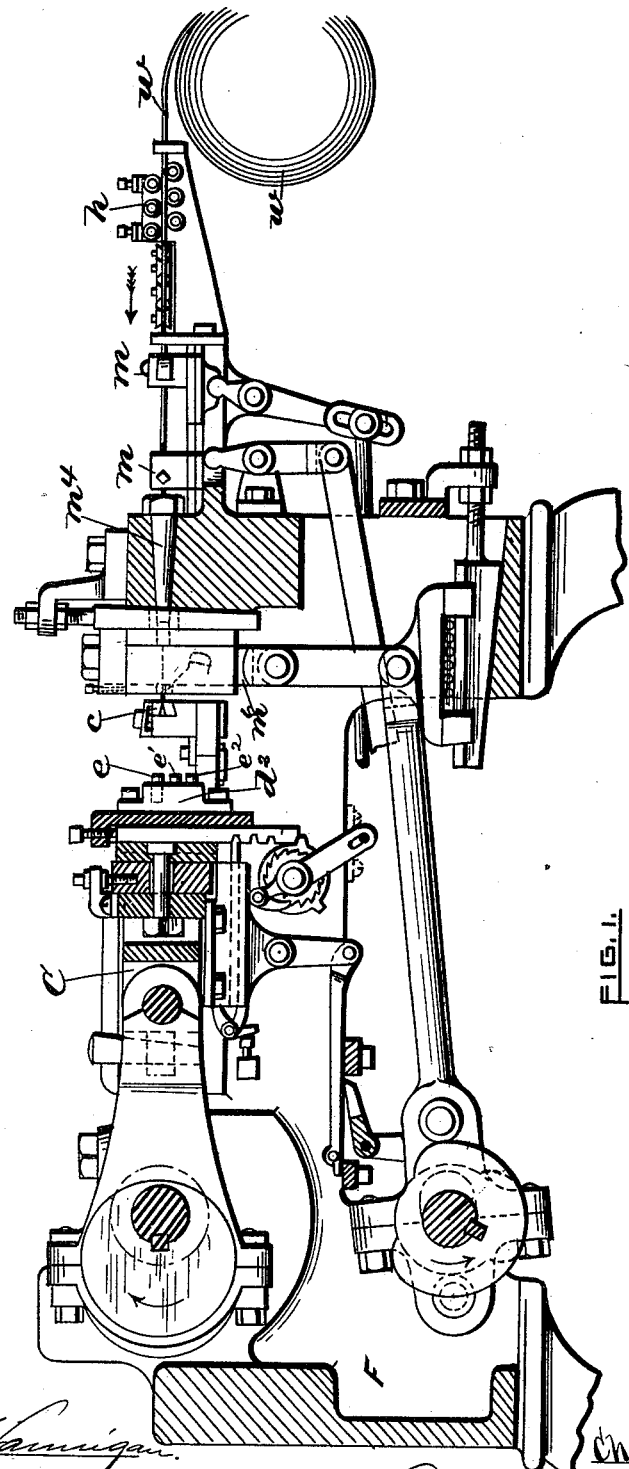

(No Model.) 6 Sheets—Sheet 1.
C. D. ROGERS.
PROCESS OF MAKING HORSESHOE NAILS.

No. 414,256. Patented Nov. 5, 1889.

WITNESSES, INVENTOR,

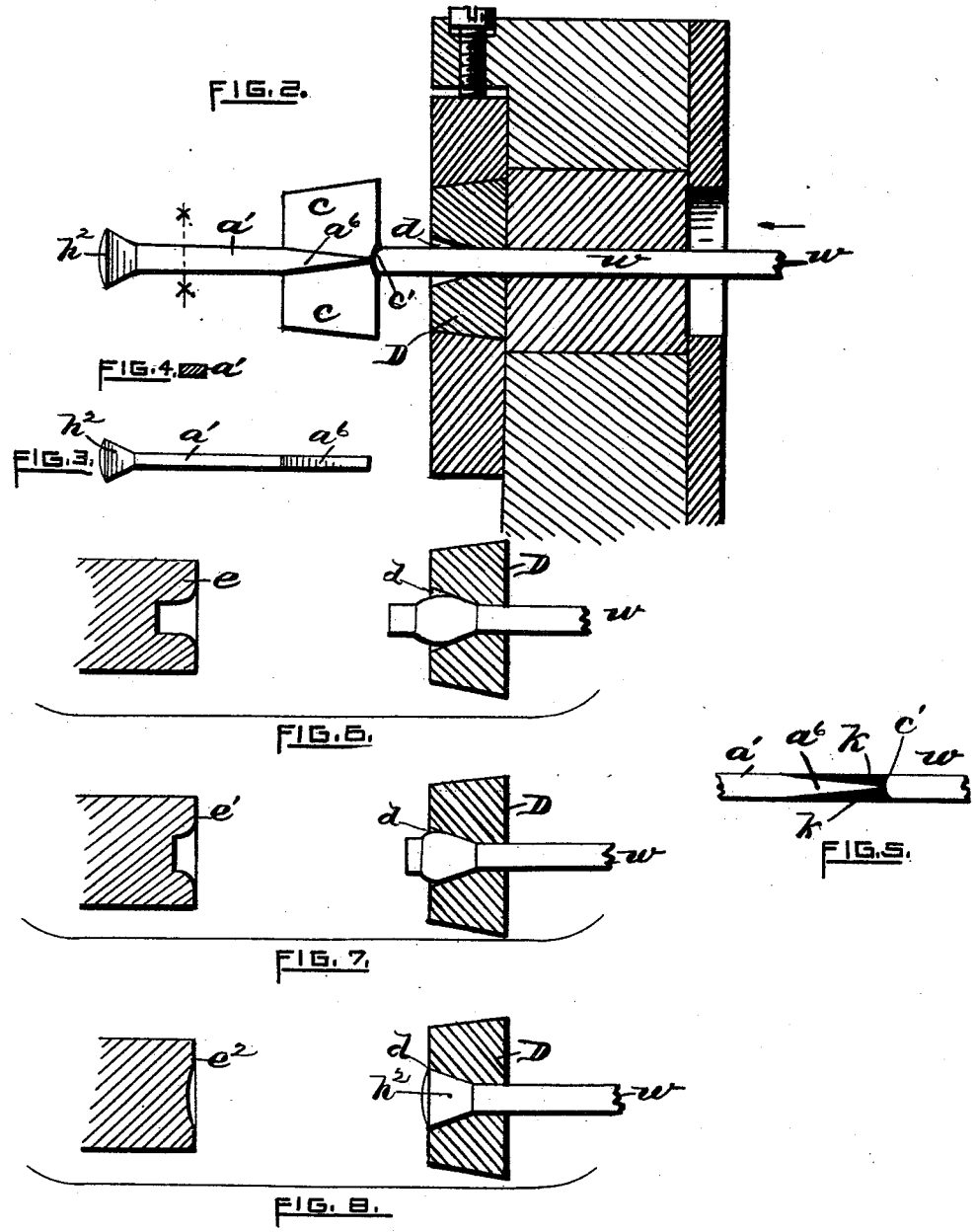

(No Model.) 6 Sheets—Sheet 4.
C. D. ROGERS.
PROCESS OF MAKING HORSESHOE NAILS.

No. 414,256. Patented Nov. 5, 1889.

WITNESSES.  INVENTOR.

(No Model.) 6 Sheets—Sheet 5.
C. D. ROGERS.
PROCESS OF MAKING HORSESHOE NAILS.
No. 414,256. Patented Nov. 5, 1889.
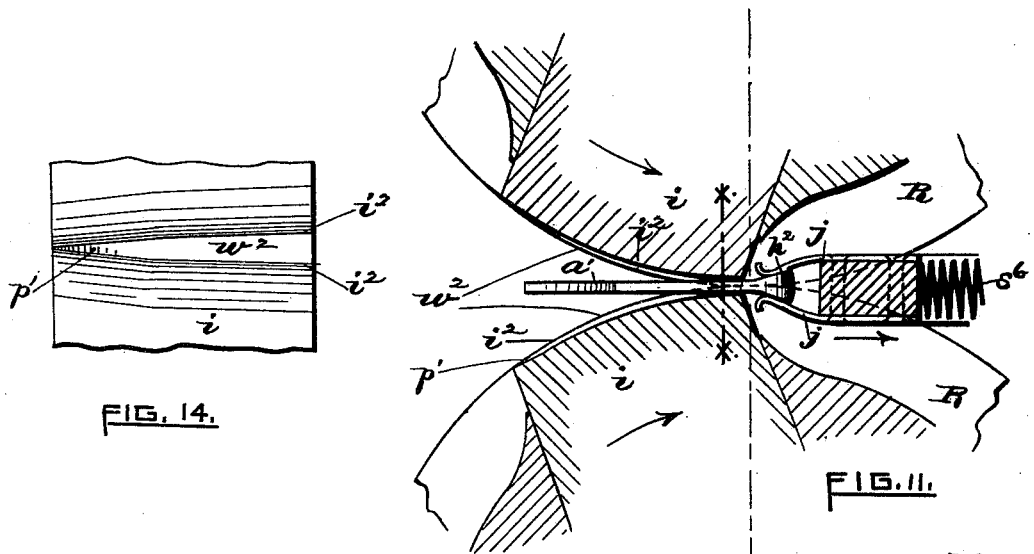
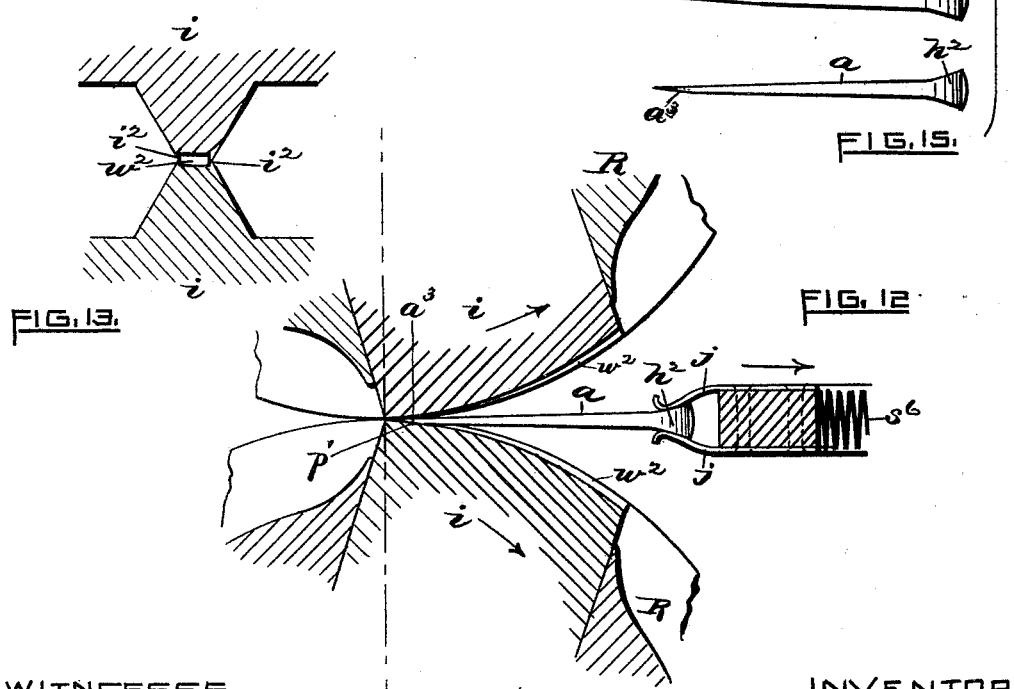
WITNESSES. INVENTOR.

(No Model.) 6 Sheets—Sheet 6.

C. D. ROGERS.
PROCESS OF MAKING HORSESHOE NAILS.

No. 414,256. Patented Nov. 5, 1889.

WITNESSES.
Charles Hannigan
Herbert F. Tourtellot

INVENTOR
Charles D. Rogers.
by Remington & Henthor
Attys

UNITED STATES PATENT OFFICE.

CHARLES D. ROGERS, OF PROVIDENCE, RHODE ISLAND, ASSIGNOR TO THE AMERICAN SCREW COMPANY, OF SAME PLACE.

PROCESS OF MAKING HORSESHOE-NAILS.

SPECIFICATION forming part of Letters Patent No. 414,256, dated November 5, 1889.

Application filed July 17, 1889. Serial No. 317,765. (No model.)

*To all whom it may concern:*

Be it known that I, CHARLES D. ROGERS, a citizen of the United States, residing at Providence, in the county of Providence and State of Rhode Island, have invented certain new and useful Improvements in the Process of Making Horseshoe-Nails; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In making nails by my process I use as the stock or raw material a wire or bar or metal of the form and size transversely of the body of the finished nail near its head. This metal may be soft or low-carbon steel. I produce the head of a nail by upsetting or forging an end of the wire in a die of the proper size and shape in a manner similar to that which I have employed in forging the heads of screws. I produce at the other end of the wire the tapering or pointed portion of a nail by shearing from the sides of the wire triangular portions and then rolling the shank between rolls, which compress and elongate the metal and bring it to the required shape and bevel the end in the manner required to make it take the proper course through the hoof. This series of operations forms a new way or process of making horseshoe-nails. I have provided and herein describe machines for performing these operations. In the first of these machines the heads are upset on the end of wire before the portion required for a nail is separated from the coil of which it forms a part. Three heading-hammers are successively brought into action to effect this operation. This and all the other operations are performed on cold metal. The same machine is provided with the devices or mechanism which cut off, after the head is formed, the portions of wire required for the nails, and at the same time shear the sides of the wire to provide for the tapering of the nail. It is not essential that the heads shall be formed before the successive portions of wire are cut off, nor that the cutting off and shearing shall be simultaneous. With suitable machines the wire might be first cut into blanks and the heads be subsequently formed. These three operations, performed upon a wire or bar of the size and shape substantially of the body of a nail near its head—viz., the upsetting of one end to form a head, the shearing at the other end to provide for the proper tapering of the nail, and the rolling of the shank to elongate and compress the metal and give it the final form required—produce a nail having a smooth surface, a compressed and hardened head, a tenacious body, and a stiff and hardened point properly beveled and sharpened. Such nails can be produced with proper machinery from soft steel at moderate cost and with but small waste or loss of material.

In order to properly represent my improved method of producing horseshoe-nails, I have prepared the appended six sheets of drawings, in which—

Figure 9:
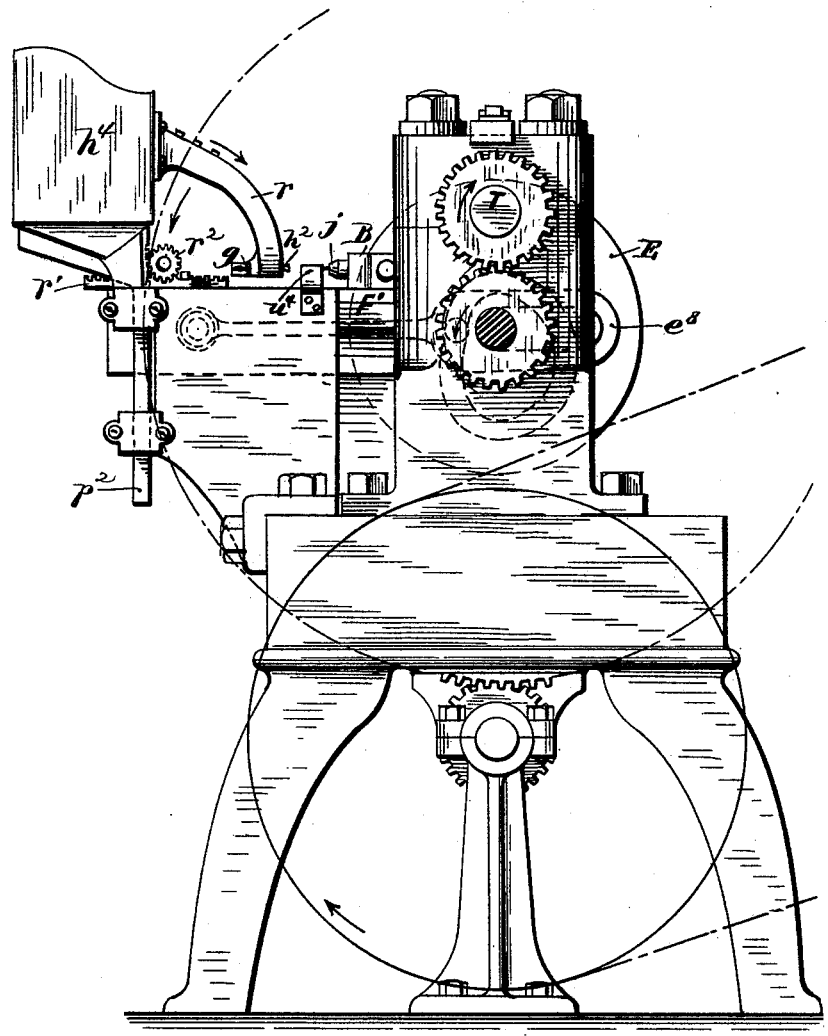
Figure 10:
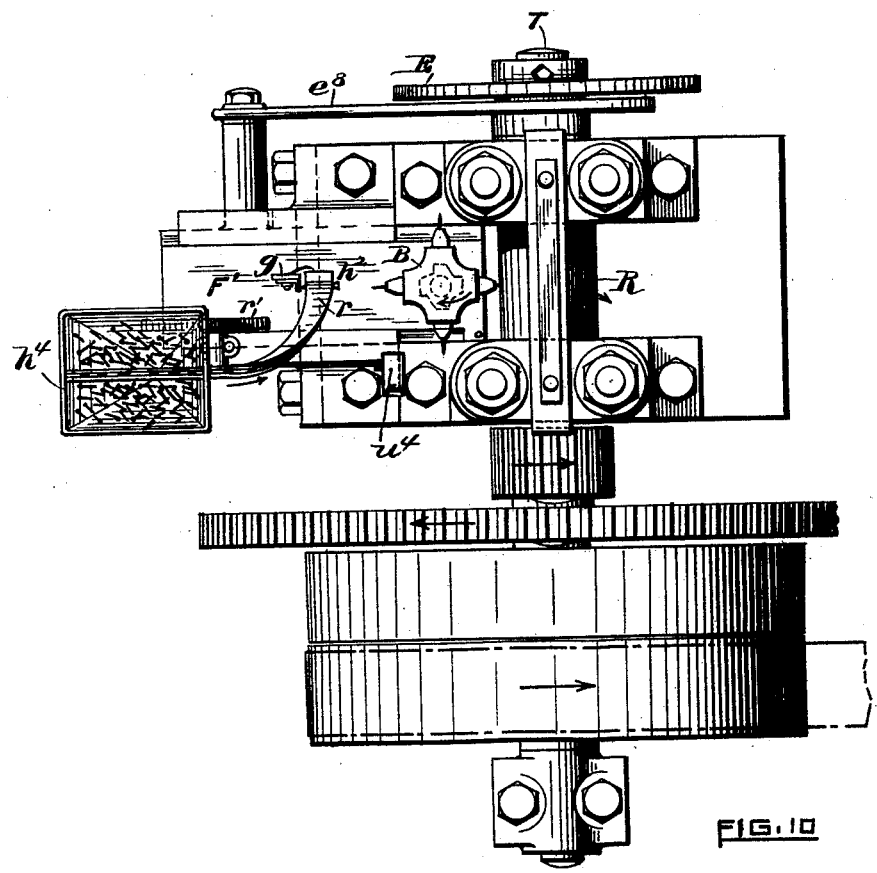
Figure 17:
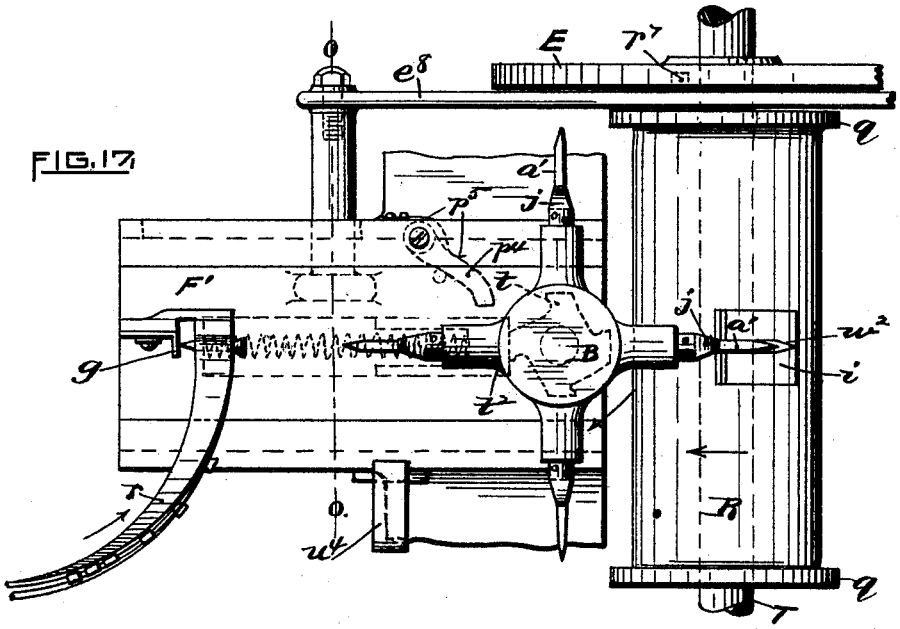
Figure 16:
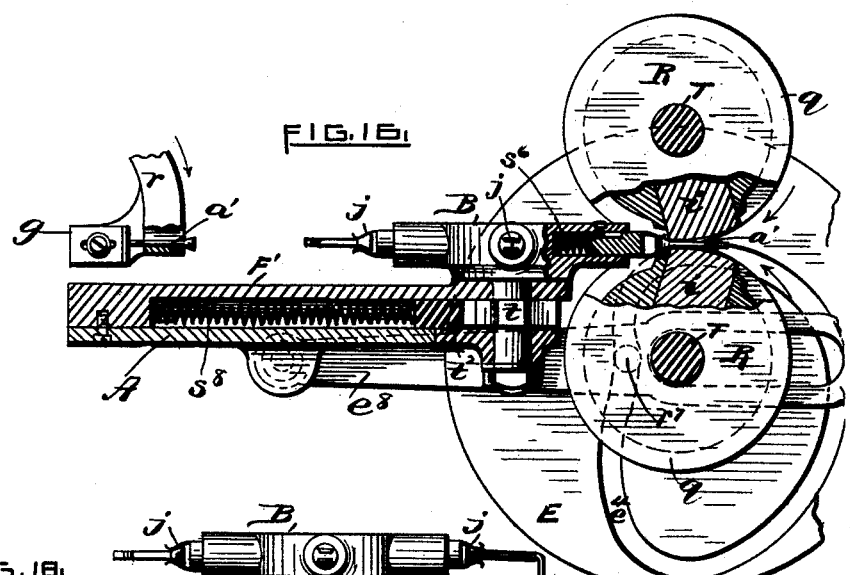
Figure 18:
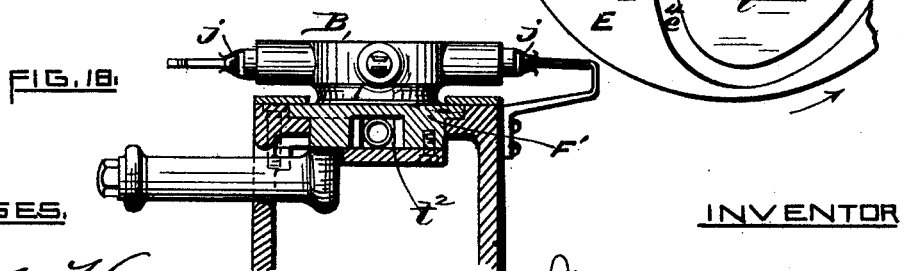

Figure 1, Sheet 1, represents a combined heading and cutting-off machine arranged to receive and hold in position an end of a coil of wire, then to swage a head upon the end of the wire, then to feed the wire ahead the desired distance and to cut off the blank, and at the same time to point it. The drawing represents a vertical longitudinal sectional view taken mainly through the center portion of the machine. Fig. 2, Sheet 2, is a horizontal sectional view, enlarged, taken through the die and die-holder and the cutting-off dies. A headed blank is also represented in the act of being severed. Fig. 3 is a side view of the blank before rolling. Fig. 4 is a cross-sectional view of it, taken on line *x x* of Fig. 2. Fig. 5 is a partial plan view, the shaded portion showing the amount of waste stock removed by the cutting-off dies. Fig. 6 shows a preliminary head formed on the end of the wire by the action of the first heading-hammer. Fig. 7 shows the head still further finished by the second hammer, and Fig. 8 is the completed head lying in the die as finished by the third hammer. Fig. 9, Sheet 3, is a side elevation of a machine adapted to receive the blanks singly and present them flatwise to and between back-rolling dies to reduce the shank to the requisite taper form and finish. Fig. 10, Sheet 4, is a plan view of the rolling-machine. Fig. 11, Sheet 5, is an enlarged transverse sectional view of a portion of the back-rolling dies, having a blank held in position between then, the dies just commencing to act upon the blank. Fig. 12 is a similar view, the dies having completed their work, thereby tapering and shearing or trimming and finishing the nail-shank, the nail meanwhile mechanically traveling rearwardly away from the dies at substantially the same rate of motion as the dies. Fig. 13 is a cross-sectional view of the dies, taken on line $x\,x$ of Fig. 11, showing the die-cavity and trimming-edges. Fig. 14 is a plan view of the lower die-cavity or mold. Fig. 15 represents side and edge views of the finished nail. Fig. 16, Sheet 6, is a partial vertical central sectional view showing the rolling-dies, blank-holder, &c. Fig. 17 is a plan view of the same, and Fig. 18 is a transverse sectional view taken on line $o\,o$ of Fig. 17.

In the machine represented in Fig. 1 of the drawings the wire $w$, having the desired form transversely, is first passed between straightening-rolls $h$, then through intermittingly-operated feeding devices $m\,m$, then through the guide $m^4$ and the adjustably-mounted die D, Fig. 2, an end of the wire projecting therefrom to be upset into the die-cavity $d$ to produce the nail-head $h^2$. A mechanically-actuated gripping-clamp $m^6$ at the rear of the die seizes the wire and firmly retains it in position during the head-forming operation. A cross-head C, carrying a holder $d^2$, in which the several progressive heading-hammers $e\,e'\,e^3$ are mounted, is made to reciprocate back and forth, the hammers meanwhile being brought successively by suitable mechanism into position to engage the wire and finish the head. After the last hammer $e^2$ has completed its work the now-finished head $h^2$ is forced from the die D and the wire fed ahead through the medium of the feed-blocks $m$ the desired distance to produce a blank, when finally the cutting-off dies $c$ are forced ahead from opposite sides of the machine to engage the wire. The joint action of the dies $c$ severs the blank from the wire, at the same time producing a point $a^6$ on the blank and rounding the end $c'$ of the standing wire to be more readily acted upon by the first hammer $e$ in producing the next head.

In Fig. 5 the shaded portions $k$ indicate substantially the amount of waste stock produced in forming each blank. The shank of the blank thus far in the process is uniform in thickness throughout, as shown at $a'$, Fig. 3, and equal to the thickness of the wire $w$.

The general arrangement of the heading-machine shown and before referred to and the manner of its operation are substantially the same as set forth in United States Patent No. 386,091, granted to me July 10, 1888.

The blanks are next transferred to a machine which feeds them singly from a hopper to a suitable carrier, which in turn presents them to the action of oppositely-revolving back-rolling dies. (See Sheets 3, 4, 5, and 6 of the drawings.) This combined rolling and finishing machine is provided with a hopper or receptacle $h^4$, into which the headed blanks are indiscriminately deposited. A reciprocating rack $r'$ operates a small gear-wheel $r^2$, which in turn reciprocates a vertical rack forming a part of the guided flat rod $p^2$. To its upper portion is secured a suitable pick-up blade, the device automatically acting to deliver the blanks by gravity to the track or runway $r$, projecting from one side, as commonly employed in screw-making machinery. The runway extends downwardly in a spiral manner, so as to present the blanks horizontally to the gripping-fingers. (See Figs. 16 and 17.) The lower end of the runway is provided with an adjustable stop-gage $g$. The gage not only serves to limit the distance the head extends from the face of the runway, but it also serves to prevent the blank from accidental displacement upon its seizure by the spring fingers or jaws $j$ of the carrier B. The latter is made to revolve in a horizontal plane by means of a star-wheel $t$ and pawl $p^4$. The carrier as drawn is provided with four sets of fingers $j$, which successively seize the blanks.

F' indicates a cross-head mounted to reciprocate in ways formed in the bed of the machine. The to-and-fro movement is attained by means of a link or connection $e^8$, jointed at one end to a stud fixed to the cross-head, the other end being slotted and provided with a roll $r^7$, working in a cam-groove $e^4$, formed in the disk E, secured to the lower main roll-shaft T.

The form of the cam-groove is such that the blank is first carried rearwardly (see Fig. 16) substantially in unison with the action of the revolving back rolls R. As the rolled blank emerges from the rolls a tooth of the star-wheel engages the normally-stationary pawl and forces the carrier around on its axis ninety degrees in the arrow direction, thus bringing a new blank in position to engage the rolls upon the return of the cross-head. The latter continues to advance on its rearward movement, thereby near the end of its stroke forcing a set of the spring-fingers $j$ over the head of a blank lying in position at the lower end of the runway. The cam in its revolution acts to withdraw the blank from the runway and quickly returns the carrier past the spring-pawl $p^4$ to the extreme of its stroke, (shown in Figs. 16 and 17,) the second preceding blank now being in position to be immediately acted upon by the two main rolls R, which are so timed that they present the dies $i$ thereof to the blank at the same instant. The fingers $j$ are secured each to a cylindrical block or holder, which in turn is mounted to move endwise in the carrier-head, but prevented from turning on its axis, and is backed by a spring $s^6$. This arrangement permits of a certain amount of elasticity or self-adjustment in the relation of the blank to the dies. Each of the lugs or teeth $t$ of the star-wheel is flattened on its face and is brought successively into engagement with a guided block $t^2$, having a spring $s^8$ at its back, (see Fig. 16,) thereby preventing the carrier from accidental movement axially. After the blank has been fully rolled and while the carrier in its rearward stroke is being revolved to carry the said blank or nail away from the rolls, and at the same time presenting a new blank in position to be acted upon by the dies on the return of the cross-head, the stationary clearer $u^4$, adjustably secured to the frame, passes between the jaws $j$ and forces the preceding finished nail from the carrier, from whence it drops into a suitable receptacle. It is evident that the carrier upon completing its quarter movement will have brought the now empty set of jaws into position to again receive a blank from the runway, as before described, at the termination of the cross-head's stroke.

The rolls R are mounted one above the other and revolve in opposite directions by gearing actuated by suitable driving mechanism. The diameters of the rolls are such that they make one revolution during each complete reciprocation of the cross-head F'. The rolls have the form of long cylinders, and are reduced in diameter, except at the ends, which form flanges $q$. The rolls are so adjusted that these flanges touch each other in operation. By this arrangement the dies $i$, mounted in the rolls, may be so nicely adjusted that the cutting-edges $i^2$, forming the walls of the dies, are prevented from actual contact with each other. The action of the dies upon the blank is well illustrated in Figs. 11 and 12 of the drawings. Figs. 16 and 17 show the dies about to engage the blank, the shank $a'$ being, as stated, uniform in thickness throughout. The revolving dies at the proper time simultaneously engage the blank at the junction of the head and shank and reduce the shank to the elongated taper form $a$, (shown in Fig. 15,) the carrier meanwhile traveling rearwardly substantially in unison with the surface speed of the dies. The dies may be so made that the die-cavity $w^2$ will lie one-half in each, as shown. The edges $i^2$ are made sharp, thereby forming rotary cutters, which act to trim the nail and remove any superfluous stock developed during the rolling. As drawn, the rolls R operate to "back-roll" the nail—that is, the dies first act upon the upper end of the blank and roll the metal rearwardly toward the point. At the same time, by means of a filling-in piece $p'$ or other suitable provision located in one of the dies at its rear end, the point of the nail is beveled on one side, as at $a^3$, Figs. 12 and 15, thus producing horseshoe-nails having the characteristic taper and point.

The whole operation is performed upon metal at ordinary temperatures and substantially by compression, and the compression to which it is subjected in this condition hardens and stiffens it and increases its tensile strength. The head especially, which is subjected in use to the greatest abrasion, is compressed and hardened by the repeated blows to which it is subjected in a die which gives it the required form. The body of the nail is also subjected to a powerful compression, which elongates its fibers and its mass in the same direction as when the metal was drawn into wire.

In a companion application for United States Letters Patent filed by me simultaneously with this I have claimed the improved horseshoe-nail produced by the method herein described and claimed.

I claim—

The method herein described of making horseshoe-nails from a wire or bar of substantially the size and shape of the body or shank of the nail near the head by upsetting or forging a head upon an end of the wire in a die of the size and shape required therefor, and by shearing the sides of the opposite end to provide for the tapering point, and by rolling the shank to flatten, elongate, and bevel its end to produce the form required and harden the metal.

In testimony whereof I have affixed my signature in presence of two witnesses.

CHARLES D. ROGERS.

Witnesses:
CHARLES HANNIGAN,
GEO. H. REMINGTON.